United States Patent [19]

Ireland

[11] Patent Number: 4,476,162

[45] Date of Patent: * Oct. 9, 1984

[54] METHOD FOR COATING LENSES

[76] Inventor: Jack W. Ireland, 180 N. Portage Path, Akron, Ohio 44303

[ * ] Notice: The portion of the term of this patent subsequent to May 12, 1998 has been disclaimed.

[21] Appl. No.: 373,418

[22] Filed: Apr. 30, 1982

[51] Int. Cl.$^3$ .......................... B05D 1/18; G02B 1/10
[52] U.S. Cl. ..................................... 427/164; 427/169; 427/240
[58] Field of Search ....................... 427/164, 169, 240

[56] References Cited

U.S. PATENT DOCUMENTS 4,267,208  5/1981  Ireland ............................ 427/164 X

*Primary Examiner*—James R. Hoffman
*Attorney, Agent, or Firm*—Maky, Renner, Otto & Boisselle

[57] ABSTRACT

Coating of the convex side of an optical lens for blocking purposes by spinning the lens about its vertical axis and dipping its downwardly facing convex side in a liquid coating material, stopping the rotation of the lens and upwardly withdrawing the lens above the level of the coating material, and spinning the upwardly withdrawn lens to spread the coating material by centrifugal force as a uniformly thin film over the convex side and to drive the film sufficiently for handling.

To facilitate the lens coating operation, the lens is held on its upper concave side by a suction cup having the upper end of its vibration damping stem chucked in the drive shaft of a hand held motor housing. To further facilitate the lens coating operation despite leakage between the suction cup and the lens, the drive shaft has a passage therethrough communicating with a passage from the suction side of the suction cup through the stem and with a flexible suction tube leading to the suction port of a power vacuum motor.

4 Claims, 8 Drawing Figures

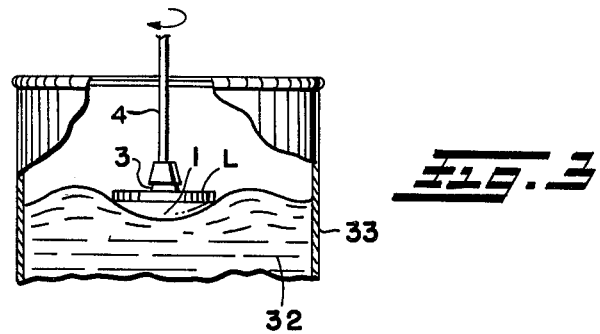
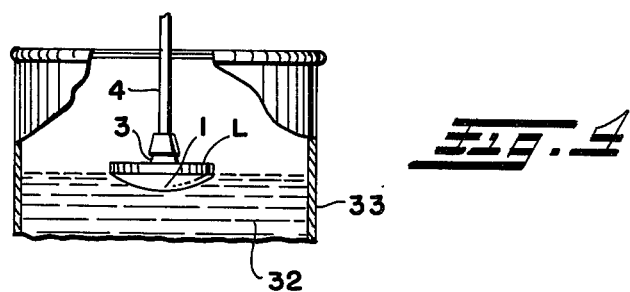
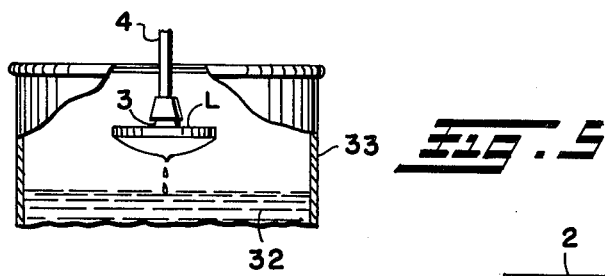
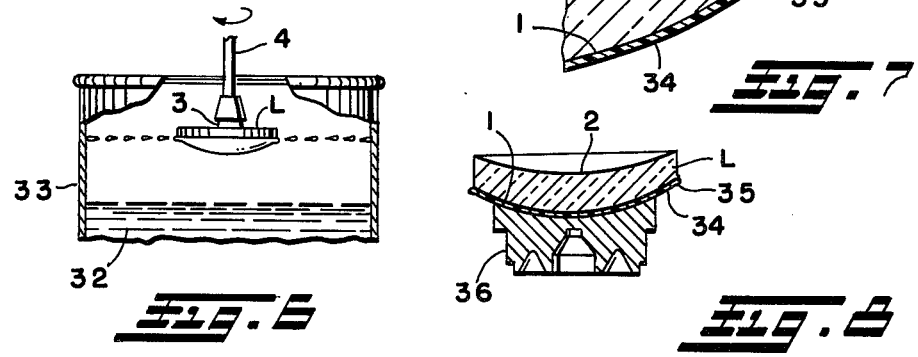

METHOD FOR COATING LENSES

BACKGROUND OF THE INVENTION

In the coating of the convex side of an optical lens for blocking purposes, it is known from my U.S. Pat. No. 4,267,208 granted May 12, 1981, to dip the downwardly facing convex side of a lens into a solvent-containing liquid coating material, to upwardly withdraw the lens above the level of the coating material to drain excess coating material from the convex side of the lens, and to spin the lens about its vertical axis to centrifugally spread out the coating material as a continuous film covering the convex side of the lens. The dipping operation must be carefully observed so as only to coat the convex side of the lens without allowing the coating material to flow onto the concave side of the lens. Moreover, if there are air encapsulated bubbles at or near the surface of the coating material, these may be left on the convex side of the lens when upwardly withdrawn from the coating material and spun and may form pin holes or pressure points that can cause or contribute to a blemished lens surface from the hot metal blocking alloy cast thereagainst or from the heat and pressure during grinding the polishing of the concave surface of the blocked lens.

In said U.S. Pat. No. 4,267,208, a flexible squeeze bulb around the stem of the suction cup constitutes a releasable vacuum source for holding the lens for dipping and spinning but occasionally due to surface dust or lint, or airborne fibers or other foreign matter on the concave side of the lens or due to raised characters on the concave side of glass lenses, there may be sufficient leakage between the suction cup and the lens to inadvertently drop the lens during the coating operation with possible damage to the lens or dropping of the lens into the coating material with resulting time-consuming cleaning operations. In the case of lenses having foreign matter or raised characters on the concave side the leakage problem is eliminated by using a special suction cup having a soft pliable sealing gasket as disclosed in my copending application U.S. Ser. No. 164,235, filed June 30, 1980, now U.S. Pat. No. 4,356,989.

SUMMARY OF THE INVENTION

The present method of coating lenses is much like that of my U.S. Pat. No. 4,267,208, except that the lens is spinning when dipped into the coating material to create a hydroplaning buoyant or floating effect on the lens which provides a sensible signal or "feel" for signalling the stopping of the descent of the lens without close visual observation; to enable immersion of the lens such that the periphery thereof may be below the coating material level with flow of coating material onto the concave surface of the lens; to enable dipping of rectangular, oblong, or irregularly shaped lenses to coat the entire convex side without inundating or swamping the concave side even though portions of the sides of such lenses are below the coating material level when portions of higher elevation, such as the corners of rectangular or oblong lenses are immersed to their full extent; to create a wiping action on the convex side of the lens that wipes or throws outwardly any air-encapsulated bubbles on or near the surface of the coating material thereby eliminating pine holes, pressure points, or other irregularities in the film coating.

The present apparatus is characterized by a light weight hand-held drive motor housing for rotating the suction cup and the lens held by the suction cup. Inadvertent dropping of lenses by leakage between the suction cup and the lens or elsewhere in the vacuum circuit is eliminated by connecting the hand-held motor housing to a flexible vacuum tube from a power vacuum motor. Accordingly, adequate suction holds the lens on the suction cup despite any such leakage. Of course, when it is desired to release the lens from the suction cup, the power vacuum motor is de-energized to equalize the pressure on the atmospheric and suction sides of the suction cup.

BRIEF DESCRIPTION OF THE DRAWINGS

FIG. 3 is a fragmentary elevation view of the step of the present method in which the convex side of an optical lens held by a rotating suction cup on its concave side is dipped into liquid coating material in a can;

FIG. 4 is a fragmentary view similar to FIG. 3 except showing the non-rotating lens ready for upward withdrawal above the level of the coating material;

FIG. 5 is a fragmentary view similar to FIG. 4 except that the non-rotating lens has been withdrawn upwardly above the level of the coating material;

FIG. 6 is a fragmentary view similar to FIG. 5 except showing the spinning of the lens about its vertical axis to spread out the coating material over the convex side of the lens and to spin off excess coating material against the inside wall of the can for reuse;

FIG. 7 is a much enlarged fragmentary radial crosssection view of a lens having a film coating as produced by the present method; and FIG. 8 illustrates a typical blocked lens.

DETAILED DESCRIPTION OF A PREFERRED EMBODIMENT

By way of illustrative example, the optical lens L has a convex side 1 which is to be coated for blocking purposes and a concave side 2 which is to be ground and polished when the blocked lens (FIG. 8) is mounted on the spindle of a grinding and polishing machine.

Figure 1:
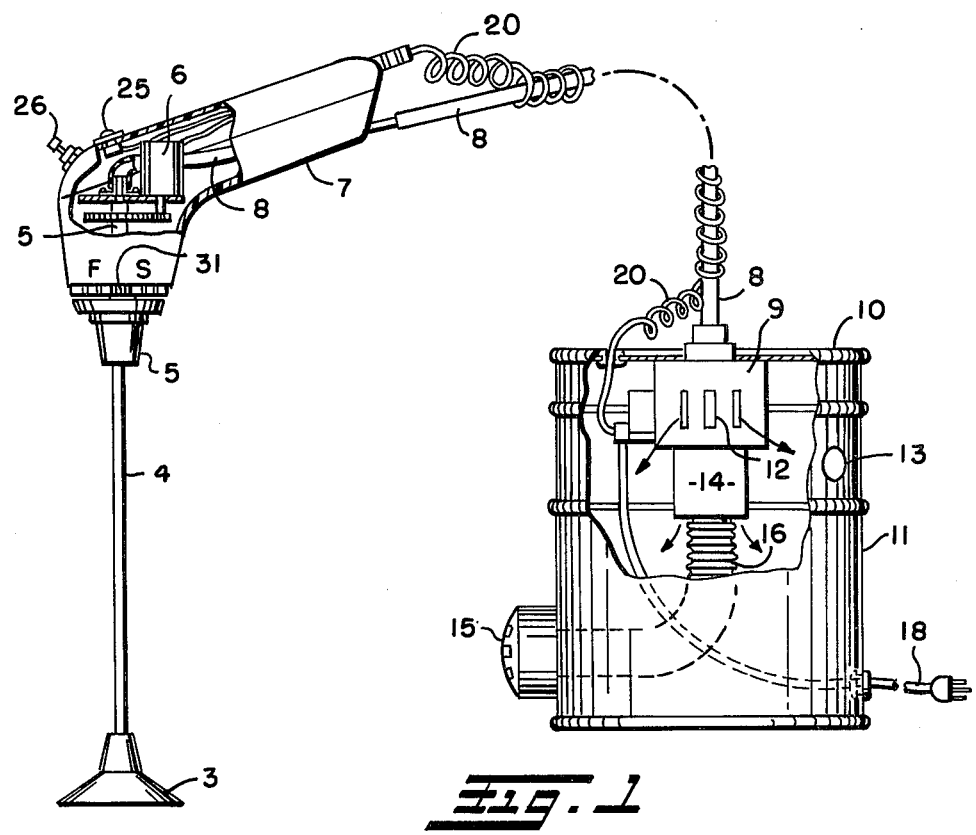
FIG. 1 is a side elevation view, partly in crosssection, illustrating a preferred form of apparatus for spin coating of optical lenses.
Figure 2:
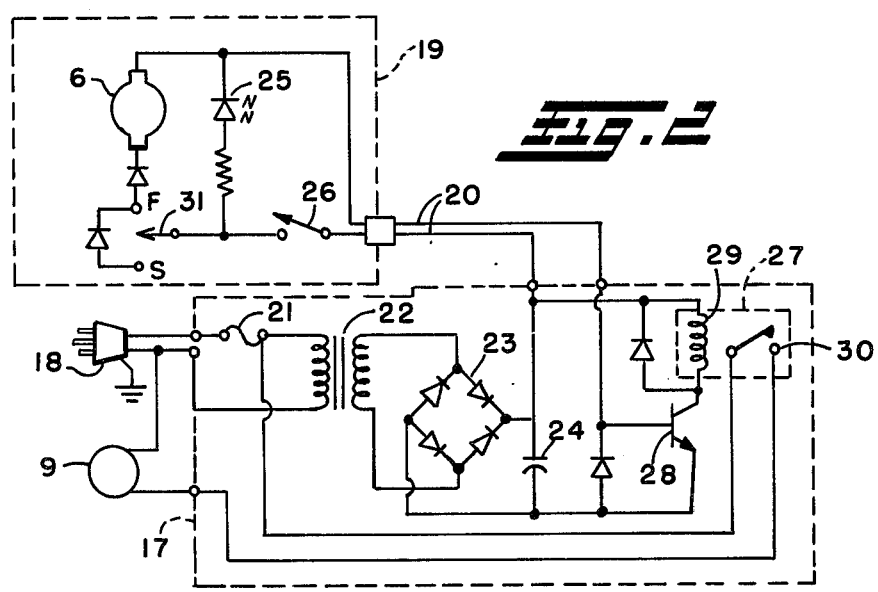
FIG. 2 is a wiring diagram for controlling the power vacuum source and the motor which drives the suction cup and the lens held thereby.

Referring to FIGS. 1 and 2, the lens L is adapted to be held by a flexible plastic or like suction cup 3 on its concave side 2, the elongated laterally flexible tubular stem 4 of the suction cup 3 being chucked in the drive shaft 5 of a low voltage DC motor 6 contained in the hollow hand-held housing 7. The drive shaft 5 is in the form of a gear meshing with a pinion on the motor 6 and has a passage therethrough communicating with the passage through the stem 4 and suction cup 3 and with the passage through the flexible vacuum tube 8 through a fitting on the support bracket for motor 6. The tube 8 extends through the rear of the housing 7 and is connected to the suction port of a vacuum motor 9 which is secured to the cover 10 of a generally cylindrical housing 11 and which has exhaust ports 12 for discharge of air into the housing 11 and out through the holes 13. The vacuum motor 9 is preferably comparable with a miniature vacuum sweeper to produce a vacuum of about 20 inch $H_2O$ which is entirely adequate even for heavy lenses L despite leakage between the suction cup 3 and the lens L or elsewhere in the vacuum circuit. The vacuum motor 9 has a cooling fan portion 14 which draws in cooling air through inlet 15 and duct 16 to circulate cooling air through the vacuum motor 9. Spent cooling air is discharged into housing 11 and is exhausted through holes 13.

Attached to the vacuum motor 9 or to cover 10 is a circuit board 17 (see FIG. 2) to which a plug-in cord 18 is connected. The housing 7 has a circuit board 19 therewith to which a two-lead cord 20 from board 17 is connected, the cord 20 being spirally coiled around the vacuum tube 8.

The circuit board 17 has a fuse 21, a transformer 22, a full wave rectifier 23, and a filter condensor 24 arranged to supply low voltage DC (3 to 3.5 volts, for example) for actuating the LED indicator 25 on housing 7 when switch 26 is closed. The board 17 also has a relay 27 which is actuated by transistor 28 for energizing the relay coil 29 to close the relay contacts 30 thereby to energize the vacuum motor 9 when it is desired to attach a lens L to the suction cup 3.

A motor control switch 31 in housing 7 provides for fast F or slow S operation of the suction cup drive motor 6. The S position (500–600 rpm) is generrlly used when coating glass lenses L with 0.001 inch to 0.002 inch thick coatings and the F position (900–1300 rpm) is generally used when coating plastic lenses L using a thicker coating material to provide, for example, 0.005 inch thick coatings either in a single application or in two applications as described in U.S. Pat. No. 4,267,208.

Attachment of a lens L to the suction cup 3 and rotation thereof is either a two-step operation or a one-step operation. The two-step operation involves closing of switch 26 for energizing the vacuum motor 9 and closing of switch 31 in F or S position to rotate the stem 4, suction cup 3 and lens L. The one-step operation (with switch 31 already in S or F position) involves only the closing of the switch 26 to energize both the motors 6 and 9. In the one-step mode of operation, a lens L held as between the thumb and forefinger is moved toward the rotating suction cup 3 and when the concave surface 2 is close to the suction cup 3, the vacuum will draw the lens against the suction cup 3 and simultaneously initiate spinning of the lens L.

When the lens L is rotting and held by the suction cup 3 the present method of coating comprises the following steps as shown in FIGS. 3 to 6.

(1) Dip or immerse the downwardly facing convex side 1 of the rotating lens L as shown in FIG. 3 in a liquid coating material 32 such as vinyl copolymer in a suitable solvent contained in a can 33 to set up an upward buoyant force which provides a "feel" signal to the operator (the weight of the hand-held assembly including the lens L being less than about 8 oz.) when the lens L is properly immersed without need of close visual observation. Such dipping also sets up a wiping action and a centrifugal whirling motion in the coating material 32 with displacement as shown in FIG. 3 for elimination of any air encapsulated bubbles usually within a short time, such as 1–4 seconds, whereby the depth of dipping is not critical and there is no inundation or swamping of the concave side 2 even with rectangular or oblong or irregularly shaped lenses L. Moreover, the stem 4 need not be precisely vertical.

(2) The next step is the opening of the switch 31 to de-energize the motor 6 to stop the rotation of the lens L as in FIG. 4 usually within a fraction of a second followed by upward withdrawal of the lens L to the FIG. 5 position to drain an initial excess of coating material 32 adhering to the convex side 1 of the lens L. In view of the coasting of the vacuum motor 9 (approximately four second delay in the release of the vacuum) it is preferred to open only the switch 26 to accomplish stopping of rotation and withdrawal and draining as in FIGS. 4 and 5 within the delay period in the release of vacuum.

(3) Following the draining of excess coating material 32 as in FIG. 5, the motor 6 is again energized either by actuating the switch 31 to the F or S position while the switch 26 remains closed or by closing the switch 26 while switch 31 remained in the F or S position. Thus, the rotating Lens L while held by the vacuum cup 3 as shown in FIG. 6, effects spreading of the coating material 32 by centrifugal force as a uniform thin film 34 over the convex side 1 of the lens L. There is also created an edge buildup of coating material 32 to form a thickened bead-like peripheral or rim portion 35 and excess coating material is spun off against the inside of the can 33 for reuse.

(4) The final step is to withdraw the spinning lens L completely out of the can 33 and continue the spinning for a few seconds until the film 34 has dried sufficiently for handling. When the film 34 has dried, the switch 26 is opened to deenergize both the motor 6 and the vacuum motor 9 whereby the lens L may be removed as by grasping the periphery as between the thumb and forefinger.

The coated lens L is then blocked in well-known manner as shown in FIG. 8 by casting a low melting poit fusible alloy 36 against the coated convex side 1 of the lens L. Prior to casting of the fusible alloy 36 against the coated side of the lens L, the coating 34 may be marked with ink of contrasting color for orienting the lens L withr espect to the alloy casting mold (not shown). The blocked lens L (FIG. 8) is secured and accurately held for performance of precision grinding and finishing operations on the concave side 2. The fusible alloy 36 may have a melting point from 117° F. to about 158° F. and may comprise, for example, Quinary eutectic alloy, Lipowitz alloy or Wood's metal.

The film 34 of coating material on the convex side 1 of the lens L seals and protects the convex side 1 from grinding and polishing materials when the concave side 2 is finished and protects the convex side 1 from heat, scratching or marring during blocking and during handling of the blocked lens L. The blocking alloy 36 adheres to the coating 34 and the coating 34 adheres to the convex side 1 of the lens L to securely and accurately hold the blocked lens L but yet the blocking alloy 36 may be separated from the coating 34 by mechanical jarring or by "picking" as known in the art. Similarly, the adherence of the coating 34 on the convex side 1 of the lens L is such that it may be peeled off. The coating material 32 is preferably a transparent vinyl copolymer in a suitable solvent and may be applied as it comes in the can 33 without thinning except for periodic thinning during prolonged periods of use in coating a plurality of lenses L. This coating material 32 may be characterized as being a relatively heavy-bodied material which forms a smooth uniformly thin pinhole free and tough coating 34 over the convex side 1 of the lens with a bead-like peripheral portion 35. The thickness of the coating depends not only on the properties of the coating material 32 but also on the rpm of spinning and the time of spinning, i.e. the number of revolutions. Generally, the preferred thickness of the coating 34 is in the 0.001 inch to 0.003 inch range for glass lenses L and up to about 0.005 inch (one or two coat application) for plastic lenses L.

The stem 4 may be of nylon or like plastic tubing and has a large length-to-diameter ratio to render the same laterally flexible to effectively dampen vibrations or oscillations in the event that the lens L axis is eccentric with respect to the suction cup and stem 4 whererby even a heavy lens will not be shaken loose from the suction cup 3. Likewise, transmission of vibrations to the housing 7 are effectively dampened to render more confortable the holding of the housing 7 in the hand during the lens spinning operations. By way of example, a 1⅜ inch diameter suction cup 3 may be provided with a stem 4 of from about 5–8 inches long and of 3/16 inch diameter.

After the concave side 2 of the lens has been ground and polished, the blocked lens L is removed from the grinding and polishing machine and then as by mechanical jarring or "picking off" the blocking alloy 36 is separated from the coated side of the lens L and by reason of the uniform smooth film 34 and thickened peripheral bead-like portion 35, the film 34 may be peeled off the lens L in a single piece.

In the case of a plastic optical lens L the coating material 32 is preferably a modified vinyl to constitute in addition to protection and sealing of the convex side 1, a heat shield to protect the plastic lens L from the blocking alloy 36 when cast against the coated side of the lens L.

The embodiments of the invention in which an exclusive property or privilege is claimed are defined as follows:

1. In the method of coating the convex side of a lens wherein the convex side of the lens is dipped in a liquid coating material, is upwardly withdrawn to drain excess coating material therefrom, and is rotated to spread the coating material over the convex side of the lens as a thin uniform coating for drying, the improvement which comprises rotating the lens while dipped in the coating material.

2. The method of claim 1 wherein the rotation of the lens is discontinued while immersed in the coating material for upward withdrawal as aforesaid.

3. A method of coating the convex side of the lens comprising the steps of rotating the lens about a vertical axis with its convex side facing downwardly; dipping the lens into a liquid coating material to immerse the concave side into the coating material while continuing to rotate the lens to create a resistance to dipping to enable proper positioning of the lens with respect to the coating material; stopping the rotation of the lens and withdrawing it upwardly from the coating material; and then again rotating the lens to remove excess coating material and spread such material over the convex side as a thin uniform coating for drying.

4. The method of coating the convex side of a lens comprising the steps of securing the concave side of the lens to a suction cup having a tubular stem communicated with a power vacuum source; rotating the stem and suction cup and thus the lens; and dipping the rotating lens into a liquid coating material to immerse the convex side of the lens into the coating material while continuing to rotate the lens to displace the surface of the coating material from the convex side of the lens.

* * * * *